L. R. POSCHADEL.
INTERNAL COMBUSTION ENGINE.
APPLICATION FILED APR. 11, 1917.

1,316,864.

Patented Sept. 23, 1919.
5 SHEETS—SHEET 3.

Witnesses
R. N. Jones.
A. E. Johnson.

Inventor
L. R. Poschadel.
By
Attorney

L. R. POSCHADEL.
INTERNAL COMBUSTION ENGINE.
APPLICATION FILED APR. 11, 1917.
1,316,864.	Patented Sept. 23, 1919.
5 SHEETS—SHEET 4.
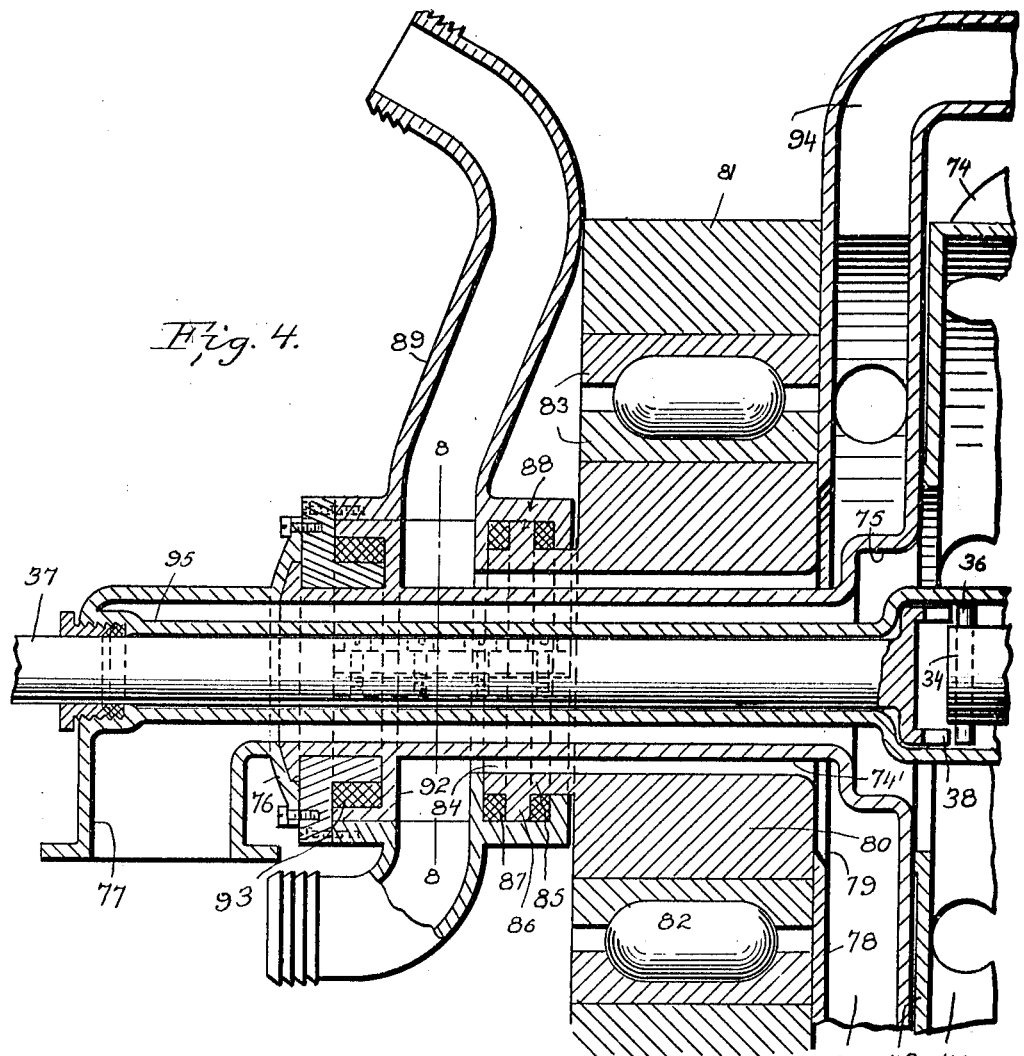
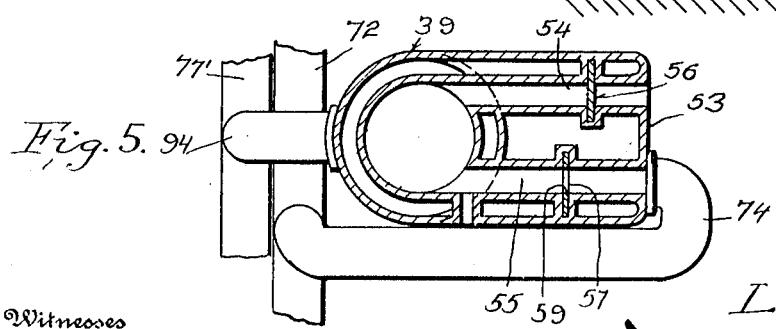
Witnesses
R. M. Jones
A. E. Johnson
Inventor
L. R. Poschadel.
By
Attorney

L. R. POSCHADEL.
INTERNAL COMBUSTION ENGINE.
APPLICATION FILED APR. 11, 1917.

1,316,864.

Patented Sept. 23, 1919.
5 SHEETS—SHEET 5.

Inventor
L. R. Poschadel.

Witnesses

Attorney

UNITED STATES PATENT OFFICE.

LEONARD R. POSCHADEL, OF MILWAUKEE, WISCONSIN.

INTERNAL-COMBUSTION ENGINE.

1,316,864.   Specification of Letters Patent.   Patented Sept. 23, 1919.

Application filed April 11, 1917. Serial No. 161,212.

*To all whom it may concern:*

Be it known that I, LEONARD R. POSCHADEL, a citizen of the United States, residing at Milwaukee, in the county of Milwaukee and State of Wisconsin, have invented certain new and useful Improvements in Internal-Combustion Engines; and I do hereby declare the following to be a full, clear, and exact description of the invention, such as will enable others skilled in the art to which it appertains to make and use the same.

The primary object of this invention is to provide an internal combustion engine of very high efficiency and comparatively simple construction, having radially arranged cylinders, the pistons of which are directly connected to a crank shaft eccentrically secured to the fly-wheel.

Another object of the invention is to provide an internal combustion engine of this nature in which the fly-wheel is rigidly connected directly to the inner end of the drive shaft and driven at high speed while the cylinders are slowly revolved to insure a thorough distribution of the lubricant which is used.

As a further object the invention aims to provide an engine which, by slight modifications, may be driven as a rotary internal combustion engine, that is with the cylinders revolving at a high rate of speed; and may also be modified so that the cylinders remain stationary while the main shaft is being rapidly rotated.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
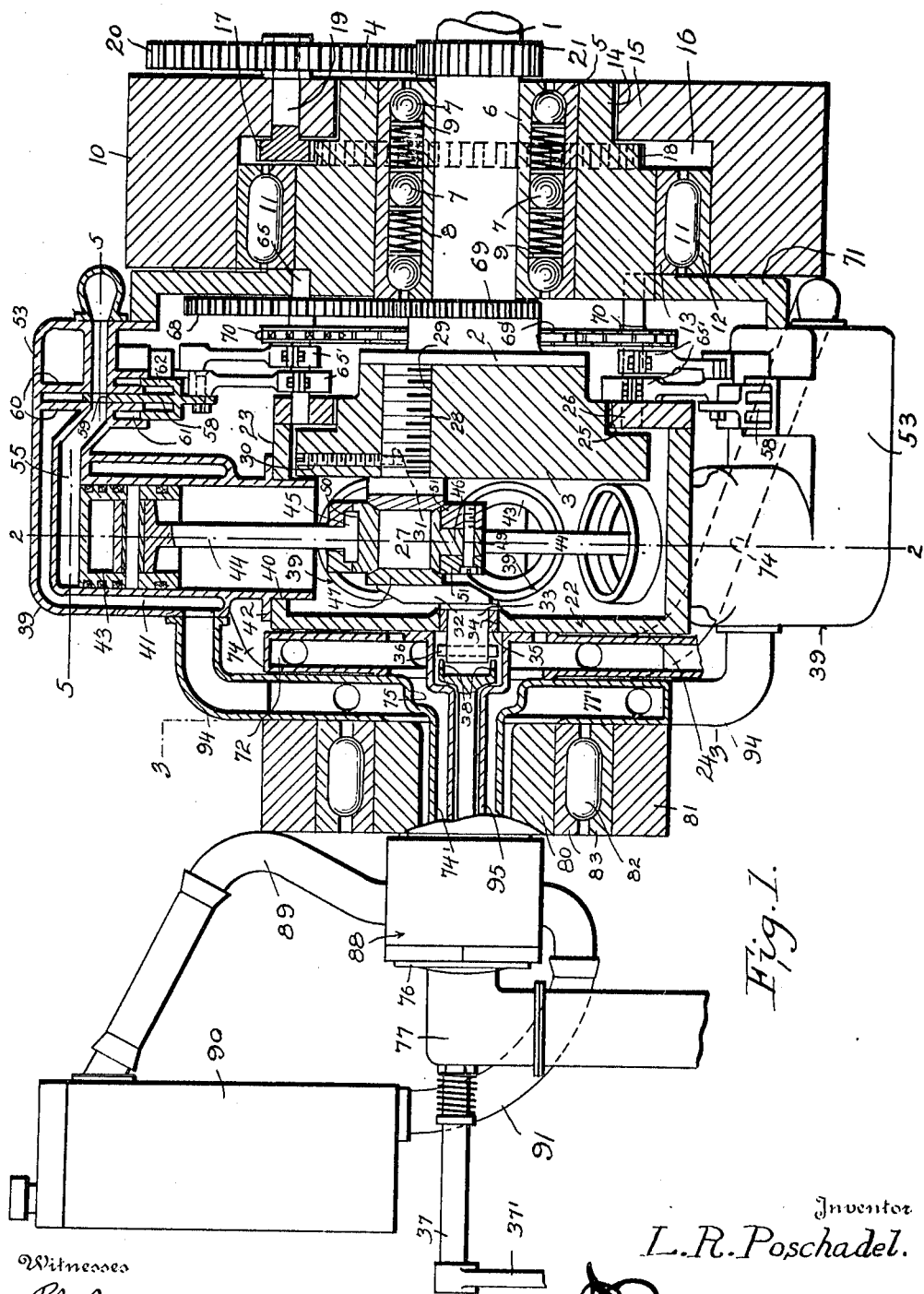
Figure 2:
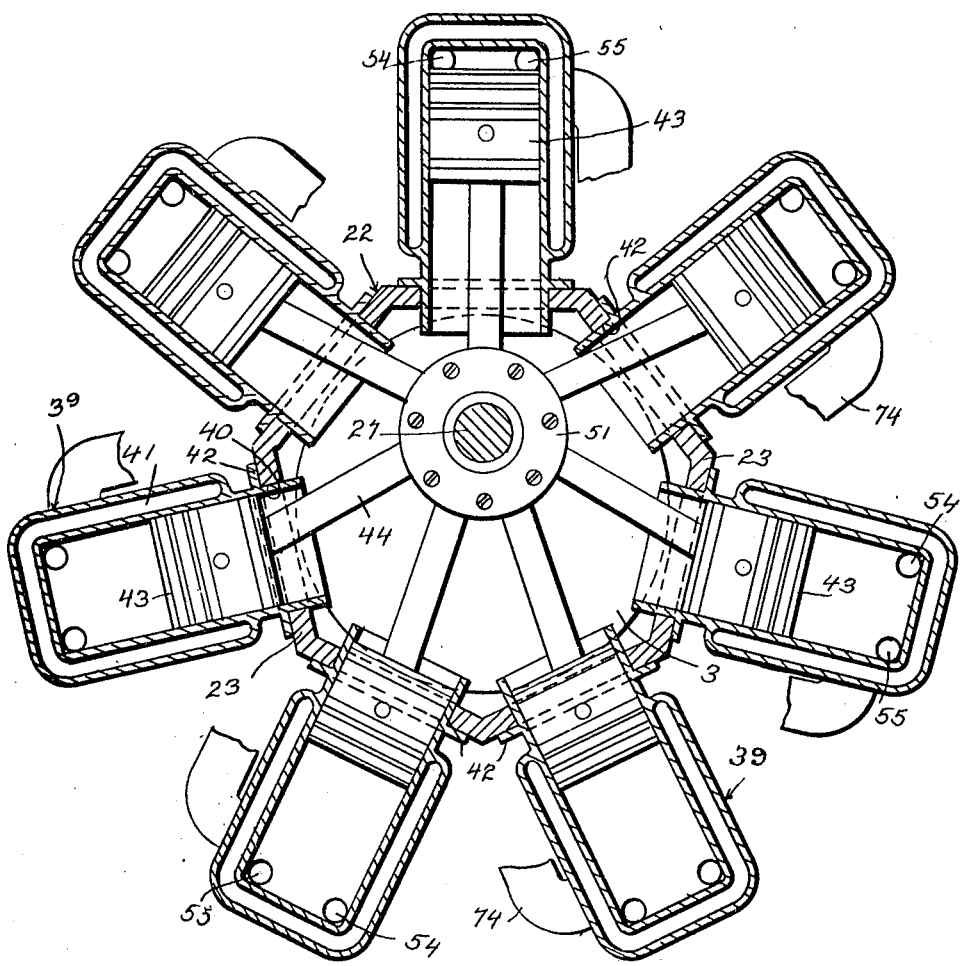
Figure 3:
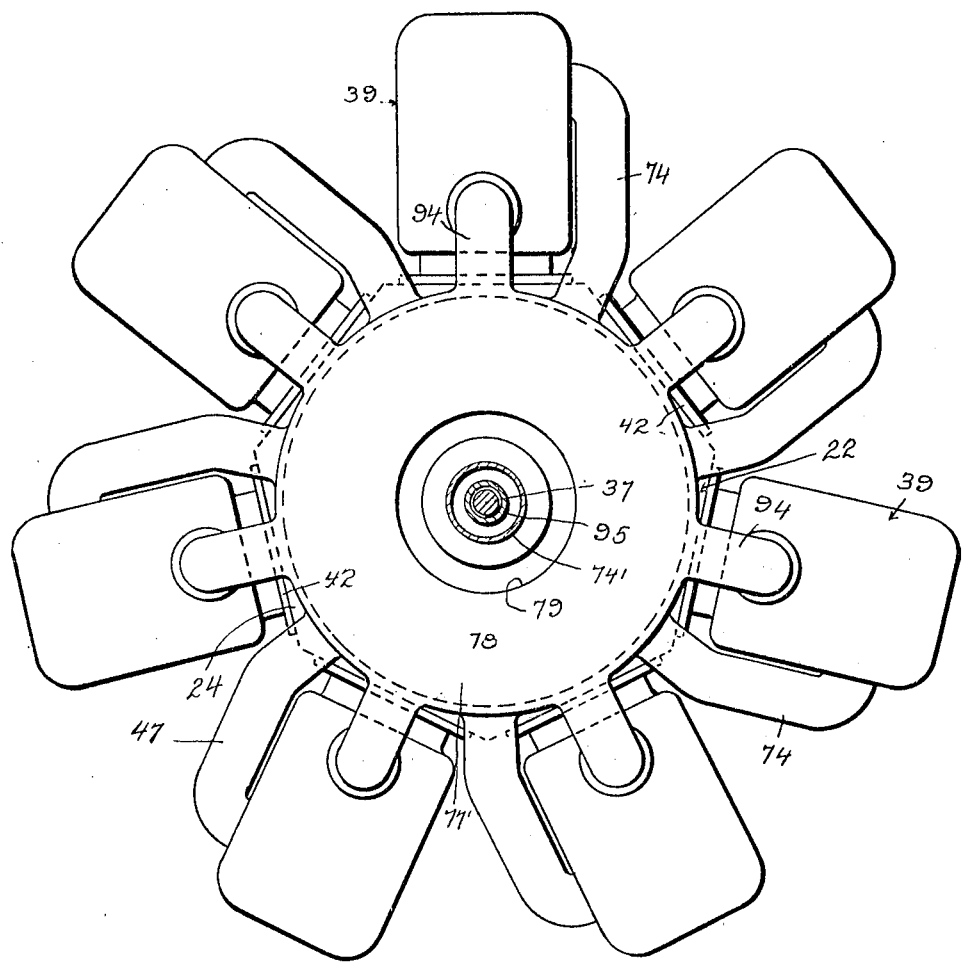
Figures 6, 7:
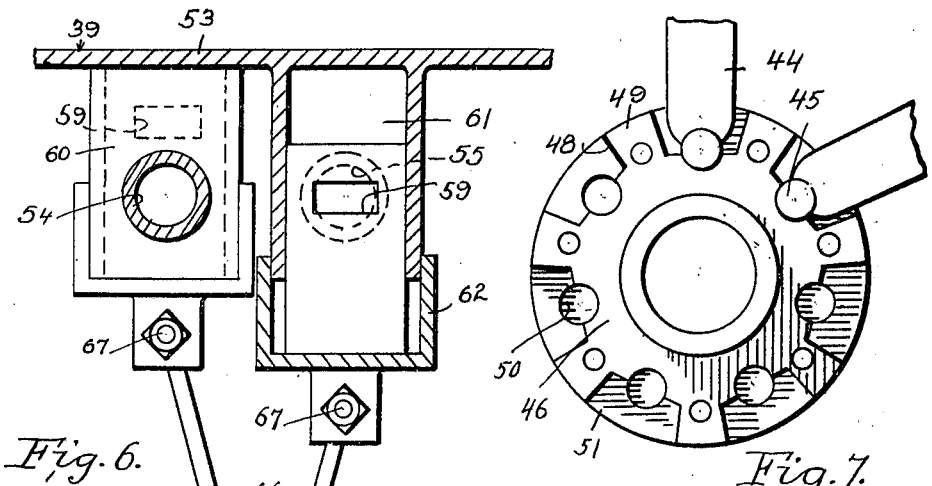
Figures 8, 9:
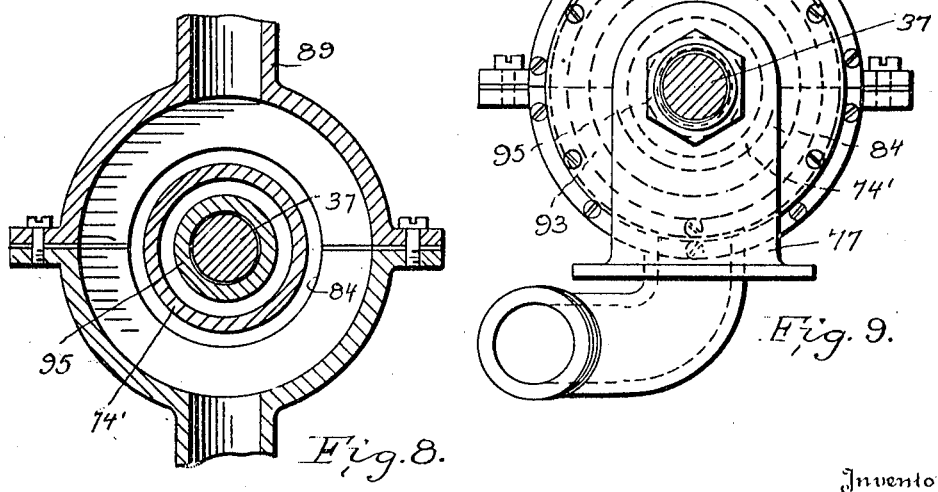

Figure 1 is a vertical, longitudinal sectional view through my improved internal combustion engine, parts thereof being shown in elevation, Fig. 2 is a transverse sectional view through the cylinders, on the plane of line 2—2 of Fig. 1, Fig. 3 is a transverse sectional view taken on the plane of line 3—3 of Fig. 1, showing a front elevation of the crank casing and cylinders, Fig. 4 is an enlarged detail sectional view taken on a vertical plane passing longitudinally through the starting shaft, Fig. 5 is a horizontal sectional view taken on the plane of line 5—5 of Fig. 1, Fig. 6 is an enlarged detail view, illustrating partly in elevation and partly in section one set of valves, Fig. 7 is a fragmentary detail view in elevation, showing the manner of connecting the piston rods to the crank shaft, Fig. 8 is a transverse section taken on the plane of line 8—8 of Fig. 4, and Fig. 9 is a fragmentary outer end elevation, showing one of the coupling constructions.

Referring in detail to the drawings by numerals, 1 designates the main or power shaft of the engine, which is formed with a head 2 on its inner end to which is bolted or otherwise rigidly secured a fly-wheel 3. The shaft 1 is rotatably supported by a revoluble bearing 4 of hollow cylindrical formation. A pair of bearing boxes 5 and 6 are arranged concentric with the shaft 1 within the support or bearing 4 and house a plurality of bearing balls 7 which are held in proper spaced relation by expansive spiral springs 8 bearing against disks 9 which engage the balls 7. The box 5 is rigidly secured to the cylindrical support or bearing 4, and the box 6 is rigidly secured to the shaft 1, as clearly illustrated in Fig. 1.

The revoluble support 4 is mounted and supported within a stationary ring 10 which may be connected to any suitable foundation. Elongated cylindrical bearings 11 are interposed between the revolving support 4 and the stationary ring 10, and are inclosed by channeled ring boxes or plates 12 and 13, the former being rigid with the ring support 10 and the latter with the revoluble bearing 4. It will be noted that the bearing 4 is of a reduced diameter adjacent its outer end, as indicated by the numeral 14, and that the stationary support 10 is formed with an internal flange 15 which projects into the cutaway portion of the bearing 4. The relative proportions of the two members 4 and 10 are such as to provide an annular chamber 16 in which is positioned a spur gear 17 to mesh with a gear 18 formed on the bearing 4 within the chamber 16. The gear 17 is formed integrally on a stem or shaft 19 carrying on its outer end a large spur gear 20 which meshes with a similar gear 21 rigidly secured to the drive shaft 1. This arrangement of gearing causes the bearing 4 to be revolved by the rotation of the drive shaft, and the reason for this will be hereinafter explained.

Taking up as next in order the crank case, designated as an entirety by the numeral 22, we see that in its preferred construction it is heptagonal having the peripheral walls 23, and a front wall 24. The fly-wheel 3 projects partly within the crank case and is of a reduced diameter, as indicated by the numeral 25, to accommodate the inner wall 26 thereof.

A crank shaft 27 having a threaded end portion 28 is eccentrically connected to the fly-wheel 3, by threading said portion 28 into an eccentric opening 29. A lock screw or pin 30 is threaded into the fly-wheel at right angles to the portion 28 of the crank shaft, and projects into an opening 31 formed therein, thereby providing a very secure lock to hold the crank shaft against rotation relative to the fly-wheel. This crank shaft, which constitutes one of the important features of my invention, is offset at 32 to bring its outer end portion 33 in longitudinal alinement with the drive shaft 1. The end portion 33 projects through a central opening 34 formed in the outer wall of the crank case, is surrounded by a suitable bushing 35 and carries near its outer end a transverse pin 36 for engagement by a starting shaft 37 having the forked arms 38.

A cylinder 39 is secured to each peripheral wall 23 of the crank case and is arranged radially with respect thereto. Each cylinder is open at its inner end, projects into the case through an opening 40 formed in the face or wall 23 and is formed exteriorly of the case with a water jacket 41. A flange 42 engages the outer face of the wall 23, providing a means whereby the cylinder may be rigidly secured in position.

A piston 43 of any desired construction is operable within each of the cylinders, and is connected to a piston rod 44 having a transverse cylindrical head 45 formed upon its inner end. The piston rods are all secured to the crank shaft 27 by a coupling 46 held against longitudinal movement by collars 47. This coupling is peripherally recessed, as indicated by the numeral 48, forming a plurality of what might be termed teeth 49, and the inner wall of each of the recesses is provided with a transverse semi-cylindrical pocket 50 in which one of the heads 45 is partly received. To hold these heads within the pocket, side plates 51 bolted to the teeth 49 are provided, and these plates are provided on their inner faces with offsets 52 which fit between the teeth 49 and which engage the outer sides of the heads 45 to hold them against movement away from the crank shaft. It will be noted that this construction allows the connecting rod a certain degree of pivotal movement with respect to the coupling 46.

Each cylinder is formed upon its rear side adjacent its outer end with an offset 53 through which extends a discharge port 54 and an intake port or passage 55, as best shown in Figs. 1 and 5. The flow through these ports or passages is controlled by valves 56 and 57 respectively which are of similar construction. Each valve comprises a main plate 58 having a port 59 to register with the passage in the offset 53, said plate being slidable between housing plates 60 arranged within the offset 53. The plates 60 form an exterior downwardly opening chamber 61 about their lower terminals in which guide plates 62 formed on the main plate 58 operate.

Each set of valves is driven by a pair of cams or eccentrics 63 and 64 secured to a shaft 65 which projects at its outer end through an opening formed in the rear wall 26 of the crank case. An eccentric strap 65' is positioned around each of the eccentrics and is connected by an arm 66 to a pin or stud 67 secured to the inner end of the corresponding valve plate 58, so that as the eccentrics are rotated, the valve will be properly driven to open and close the ports.

One of the shafts 65 is driven directly from the power shaft or main shaft 1 by a large spur gear 68 meshing with a gear 69 rigid with said main shaft. The other shafts 65 are driven from the first mentioned shaft 65 by a chain 69' running around gears 70 rigid with said first and second mentioned shafts 65. The valves and valve gearing are housed within a casing formed by the cylindrical wall 71 which is rigidly connected to the cylinders and to the revolving support 4.

Coming now to the means by which gas is conveyed to the intake opening 55, 72 designates a chamber formed on the outer face of the crank case wall 24 by a cylindrical casing 73 and pipes 74 radiate from this casing and connect at their outer ends with the outer terminals of the passages 55. A pipe 74' extends laterally from a central opening 75 formed in the casing 73 and is connected at its outer end by a suitable coupling 76 to an elbow 77 which is stationary and which is supplied from the carbureter not shown. It will be seen that an explosive mixture may flow through the elbow 77, pipe 74 into the chamber 72, and from thence through the pipe 74' to the cylinders.

Water for cooling purposes circulates through a cylindrical chamber 77' formed on the outer face of the casing wall 73 by a second casing wall 78 having a central opening 79 and rigidly connected to a revoluble ring support 80, mounted within a stationary supporting ring 81 and spaced therefrom by suitable bearings 82 contained within housings or boxing 83 similar to those previously described. The bearing 80 is formed around its central passage 84 with a laterally projecting flange 85 having an annular rib 86 which is received within a stuffing box 87 forming a part of a stationary coupling, designated as an entirety by the numeral 88. A pipe 89 leads from the top of the coupling 88 to the top of the radiator 90, and a pipe 91 leads from the bottom of the radiator to the bottom of said coupling, as best shown in Fig. 1. Water is prevented from leaking at the front part of the coupling around the pipe 74' by an angular laterally projecting flange 92 formed thereon and projecting into the packing chamber 93. Pipes 94 convey water from the chamber 77' to the water jacket of the cylinders. The circulation which I have provided is what is known as the gravity system, and since the radiator is positioned above the longitudinal center of the engine and forms the highest point in the system, the water as it becomes heated will flow therethrough, being displaced by cold water flowing from the bottom of the radiator, as will be clearly understood.

To start the engine, the starting shaft 37 is forced inwardly to engage the pin 36 and then rotated by means of the handle 37'. It will be noted that a tubular casing 95 extends concentrically through the gasolene pipe 74', is enlarged at its inner end and connected to the outer wall 24 of the crank case. Any desired system of ignition may be provided and the cylinders may be fired in any proper sequence so as to properly drive against the crank shaft 27 to rotate the fly-wheel 3 and in turn the main shaft 1. This shaft through the medium of the gears 20, 21, 17 and 18 revolves the bearing 4 and this being connected by the casing 71 to the cylinders causes the cylinders and crank case to be revolved slowly, thus insuring a proper distribution of a lubricant when introduced therein.

Now if it is desired to run the motor with the cylinders stationary, its construction may be greatly simplified by omitting many of the parts, such for instance, as the gears 17, 18, 20 and 21. The revoluble bearing 4 and bearing balls 7 with their coöperating boxes, may also be omitted. At the front of the engine, the bearing 80 with the coöperating anti-friction means and the complicated coupling 88 and the coupling 77 may also be dispensed with, since these parts will then be no longer necessary. Certain changes in the remaining parts which coöperated with the omitted parts, will of course have to be made, but these are mere details of construction which concern in no way the basic idea of the invention.

I desire it to be also understood that this motor may, after making such changes as will be clearly understood by those familiar with the art, be run as a rotary engine, that is to say, with the cylinders rapidly revolving.

From the foregoing description taken in connection with the accompanying drawings, it will be apparent that I have provided a highly efficient and practical internal combustion engine, which by slight modification, may be run in different ways. The cylinders may, of course, be air cooled, if desired.

While I have shown and described the preferred embodiment of my invention, it will be understood that minor changes in construction, combination and arrangement of parts may be made without departing from the spirit and scope of the invention as claimed.

Having thus described my invention, I claim:—

1. In an internal combustion engine, a main shaft, a fly wheel secured to one end of said shaft, a stub shaft eccentrically connected to the fly wheel, a crank case inclosing the stub shaft, cylinders radiating from said crank case, pistons for said cylinders, piston rods connected to said pistons and to said stub shaft, a rotatable bearing for the main shaft, means for rotating said bearing, said means being driven by a main shaft and means connecting the bearing with the cylinders whereby the latter are rotated.

2. In an internal combustion engine, a main shaft, a fly wheel secured to said shaft, a crank shaft eccentrically connected to the fly wheel, a crank case, cylinders radiating from said crank case, pistons for said cylinders, said pistons having connection with the crank case, a rotatable bearing for said main shaft, gearing to rotate said bearing, said gearing being driven by the rotation of the main shaft, and means rigidly connecting the rotatable bearing with the cylinders whereby the latter are revolved about said crank shaft.

3. In an internal combustion engine, a main shaft, a crank case, radially arranged cylinders carried by the crank case, a bearing carried by the crank case and surrounding said shaft, pistons disposed within said cylinders and connected to said crank shaft, intake and exhaust valves for said cylinders, cam shafts journaled in and connecting the crank case and said bearing, means operatively connecting the valve to said cam shafts, a gear formed on the main shaft, a gear mounted on one of said cam shafts and meshing with the first mentioned gear, and means for driving the remaining cam shafts from the last mentioned cam shafts.

4. An explosive engine including a shaft, cylinders surrounding the shaft, a rotatable bearing carried by said shaft, a sectional annular bearing disposed between said rotatable bearing and said shaft, gearing connecting said shaft and said rotatable bearing, and an annular member disposed between said rotatable bearing and said cylinders and rigidly connecting the same whereby the rotation of said shaft rotates said cylinders.

5. An explosive engine including a main shaft, a crank case, cylinders carried by the crank case, a crank shaft arranged within the crank case and connected to said main shaft, a rotatable bearing for said main shaft, a stationary bearing supporting said rotatable bearing, gearing operatively connecting said main shaft and said rotatable bearing, and a member rigidly connecting said rotatable bearing and said cylinders for operating the same together.

6. In an explosive engine, a pair of stationary spaced bearings, a rotatable bearing supported in one of the stationary bearings, a crank case carried by and rotatable with said rotatable bearing, a crank shaft journaled in said rotatable bearing member, radially disposed cylinders carried by the crank case, pistons reciprocally mounted in the cylinders, means connecting said pistons with said crank shaft, means rotatably supporting said crank case in the other stationary bearing, and a starting device extending through the last mentioned bearing and attachable to the inner terminal of the crank shaft.

7. An internal combustion engine including a shaft, cylinders disposed about the shaft, a stationary bearing, a rotatable bearing disposed within the stationary bearing and surrounding said shaft and operatively connected to said cylinders, said rotatable bearing having circumferential teeth forming a gear, and a train of gears carried by said shaft and said stationary bearing and connected to said first named gear.

In testimony whereof I affix my signature in presence of two witnesses.

LEONARD R. POSCHADEL.

Witnesses:
LILLIAN SINDT,
ADNA H. MILLER.

Copies of this patent may be obtained for five cents each, by addressing the "Commissioner of Patents, Washington, D. C."